US00RE41086E

(19) United States
(12) Reissued Patent
Hachisu

(10) Patent Number: US RE41,086 E
(45) Date of Reissued Patent: Jan. 26, 2010

(54) ELECTRON SOURCE SUBSTRATE, PRODUCTION METHOD THEREOF, AND IMAGE FORMING APPARATUS USING ELECTRON SOURCE SUBSTRATE

(75) Inventor: Takahiro Hachisu, Kanagawa (JP)

(73) Assignee: Canon Kabushiki Kaisha, Tokyo (JP)

(21) Appl. No.: 11/704,906

(22) Filed: Feb. 8, 2007

Related U.S. Patent Documents

Reissue of:
(64) Patent No.: 6,853,128
Issued: Feb. 8, 2005
Appl. No.: 10/227,206
Filed: Aug. 26, 2002

(30) Foreign Application Priority Data

Aug. 28, 2001 (JP) ..... 2001/257176

(51) Int. Cl.
*H01J 1/62* (2006.01)

(52) U.S. Cl. ..... 313/495; 313/310
(58) Field of Classification Search ..... 313/495, 313/310
See application file for complete search history.

(56) References Cited

U.S. PATENT DOCUMENTS

| | | | | |
|---|---|---|---|---|
| 4,904,895 | A | 2/1990 | Tsukamoto et al. | 313/336 |
| 5,023,110 | A | 6/1991 | Nomura et al. | 427/49 |
| 5,066,883 | A | 11/1991 | Yoshioka et al. | 313/309 |
| 5,659,329 | A | 8/1997 | Yamanobe et al. | 345/74 |
| 6,060,113 | A | 5/2000 | Banno et al. | 427/78 |
| 6,344,711 | B1 | 2/2002 | Ohnishi et al. | 313/495 |
| 6,384,541 | B1 | 5/2002 | Ohnishi et al. | 315/169.3 |
| 6,390,873 | B1 | 5/2002 | Banno et al. | 445/6 |
| 6,419,746 | B1 | 7/2002 | Banno et al. | 118/323 |
| 7,097,530 | B2 | 8/2006 | Katakura et al. | 445/50 |

FOREIGN PATENT DOCUMENTS

| | | |
|---|---|---|
| EP | 1 003 197 A2 | 5/2000 |
| JP | 63-274047 | 11/1988 |
| JP | 63-274048 | 11/1988 |
| JP | 1-279538 | 11/1989 |
| JP | 2-56822 | 2/1990 |
| JP | HO 3-203144 | 9/1991 |
| JP | H0 3-261028 | 11/1991 |
| JP | 6-342636 | 12/1994 |

(Continued)

OTHER PUBLICATIONS

Brodie, Ivor, *Advanced Technology: flat cold–cathode CRTs*, Information Display, vol. 5, No. 1., (Jan. 1989) pp. 17–19.

M.I. Elinson, et al., *The Emission of Hot Electrons and the Field Emission of Electrons from Tin Oxide*, Radio Engineering and Electronic Physics, (Jul. 1965), pp. 1290–1296.

G. Dittmer, *Electrical Conduction and Electron Emission of Discontinuous Thin Films*, Thin Solid Films 9 (1972) pp. 317–328.

M. Hartwell, et al., *Strong Electron Emission From Patterned Tin–Indium Oxide Thin Films*, International Electron Devices Meeting, (1975) pp. 519–521 (English Abstract on p. 22).

*Primary Examiner*—Vip Patel
(74) *Attorney, Agent, or Firm*—Fitzpatrick, Cella, Harper & Scinto

(57) ABSTRACT

An electron source substrate has an electron-emitting device consisting of a pair of device electrodes and an electroconductive thin film having an electron-emitting region; and metal wiring coupled to the device electrodes and made in a composition different from that of the device electrodes, on a substrate. A shortest distance between the conductive thin film and the metal wiring along an interface between the device electrodes and the substrate is not less than 50 μm. This configuration is able to effectively prevent diffusion of the wiring metal to the conductive thin film and to the electron-emitting region which can cause degradation of electron emission characteristics.

24 Claims, 9 Drawing Sheets

FOREIGN PATENT DOCUMENTS

| | | |
|---|---|---|
| JP | 7-235255 | 9/1995 |
| JP | 8-180797 | 7/1996 |
| JP | 9-17333 | 1/1997 |
| JP | 9-69334 | 3/1997 |
| JP | 2000-215789 | 8/2000 |
| JP | 2000-243327 | 9/2000 |

ELECTRON SOURCE SUBSTRATE, PRODUCTION METHOD THEREOF, AND IMAGE FORMING APPARATUS USING ELECTRON SOURCE SUBSTRATE

Matter enclosed in heavy brackets [ ] appears in the original patent but forms no part of this reissue specification; matter printed in italics indicates the additions made by reissue.

*This application is a reissue of U.S. Pat. No. 6,853,128 B2, issued on Feb. 8, 2005, which matured from U.S. application No. 10/227,206, filed Aug. 26, 2002.*

BACKGROUND OF THE INVENTION

1. Field of the Invention

The present invention relates to an electron source substrate using electron-emitting devices, a production method thereof, and image forming apparatus using the electron source substrate.

2. Related Background Art

As conventional image forming apparatus making use of electron-emitting devices, there are known flat electron beam display panels in which an electron source substrate with a number of cold cathode electron-emitting devices therein and an anode substrate with a transparent electrode and a fluorescent material are opposed to each other in parallel and in which the interior is evacuated into vacuum. Among such image forming apparatus, one using field emission electron-emitting devices is disclosed, for example, in I. Brodie, "Advanced technology: flat cold-cathode CRTs," Information Display, 1/89, 17 (1989). The field emission electron-emitting devices with a pair of electrodes on a substrate surface are disclosed in Japanese Patent Applications Laid-Open No. 63-274047 and No. 63-274048, U.S. Pat. No. 4,904,895, and so on.

The apparatus using surface conduction electron-emitting devices is disclosed, for example, in U.S. Pat. No. 5,066,883 and other documents. The flat electron beam display panels can be substantiated in lighter-weight and larger-screen structure than the cathode ray tube (CRT) display apparatus commonly used at present, and can provide images with higher luminance and higher quality than the other flat display panels such as flat display panels making use of liquid crystals, plasma displays, electroluminescent displays, and so on.

Particularly, the surface conduction electron-emitting devices are simple in structure and easy in production and are advantageous in that an electron source substrate with a number of devices arrayed over a large area can be fabricated without need for going through complicated production steps taking advantage of the photolithography technologies, whereas the field emission electron-emitting devices have to be fabricated through such steps.

FIG. 10 shows an example of the electron source substrate using the surface conduction electron-emitting devices, which is disclosed in Japanese Patent Application Laid-Open No. 06-342636. FIG. 10 is a plan view showing part of the electron source. In FIG. 10, reference numeral 1 designates a base, 2 and 3 device electrodes, 4 an electroconductive thin film having an electron-emitting region in each device, and 5 the electron-emitting region in each device. The device electrodes 2, 3 are coupled to lower wiring lines 6 and to upper wiring lines 7, respectively, and the lower wiring lines 6 and upper wiring lines 7 are electrically insulated from each other by interlayer dielectric layers 8.

Numeral 101 indicates one of surface conduction electron-emitting devices.

Predetermined voltages are successively applied as scanning signals and as information signals to the upper wires 7 and to the lower wires 6, respectively, in the matrix arrangement, whereby the predetermined electron-emitting devices located at intersections of the matrix can be selectively driven.

This matrix-arranged electron source substrate can be fabricated by relatively simple photolithography technologies, but it is preferable to employ print techniques for formation of larger substrates. Particularly, concerning the upper wiring lines to which the scanning signals are applied, the amount of electric current flowing through the wiring increases with increase in the number of devices connected per line, so as to result in a voltage drop due to wiring resistance; therefore, it is preferable to form thick films of wiring so as to reduce the resistance as much as possible.

Japanese Patent Application Laid-Open No. 08-180797 and others disclose production methods of forming the wiring and interlayer dielectric layers by screen printing. As for the other members, for example, Japanese Patent Application Laid-Open No. 09-17333 and others disclose production methods of forming the device electrodes by offset printing or the like, and Japanese Patent Application Laid-Open No. 09-69334 and others disclose production methods of forming the electroconductive thin films by the ink jet method. By employing these printing techniques, it is feasible to fabricate the electron source substrate of large area readily.

Besides the above-cited documents, there are various reports on the surface conduction electron-emitting devices; for example, those using a thin film of $SnO_2$ [M. I. Elinson, Radio Eng. Electron Phys., 10, 1290 (1965)] and [G. Dittmer: "Thin Solid Films," 9, 317 (1972)]; those using a thin film of $In_2O_3/SnO_2$ [M. Hartwell and C. G. Fonstad: "IEEE Trans. ED Conf.," 51 9 (1975)]; those using a thin film of carbon [Hisashi Araki et al.: "Vacuum, Vol. 26, No. 1, p22 (1983)], and so on. For example, Japanese Patent Application Laid-Open No. 02-56822 discloses the surface conduction electron-emitting devices using a metal microparticle film of palladium oxide or the like.

In fabrication of the surface conduction electron-emitting devices, it is common practice to form the electron-emitting regions 5 by energization operation, called forming, on the electroconductive thin films 4. The forming is an operation of placing a dc voltage or a very slowly increasing voltage, e.g., approximately 1 V/min, at the both ends of each electroconductive thin film 4 to locally break, deform, or modify the electroconductive thin film 4, thereby forming a fissure.

After completion of the forming operation, a voltage is applied to the electroconductive thin film 4 to let an electric current flow through the device, whereupon electrons are emitted from the vicinity of the fissure. A portion emitting electrons at this time is called the electron-emitting region 5.

Furthermore, it is feasible to achieve better electron emission, by effecting a process called an activation operation on the devices after the forming, for example, as disclosed in Japanese Patent Application Laid-Open No. 07-235255. The activation step can be performed by repeatedly applying a pulse voltage to the devices, similarly as in the forming operation, under an atmosphere containing a gas of an organic substance, whereby carbon or carbon compounds are deposited from the organic substance existing in the atmosphere, onto the devices. The activation operation extremely increases the device current If and the emission current Ie.

The surface conduction electron-emitting devices fabricated through these operations have adequate electron emission characteristics as electron sources applicable to the image forming apparatus, for example, such as the flat panel displays and others.

By fabricating the large-area electron source substrate comprised of the surface conduction electron-emitting devices by the print techniques as described above, it is thus feasible to realize a large-area image forming apparatus, e.g., a large-screen flat panel display.

In the case where the large-area electron source substrate is constructed of the electron-emitting devices with sufficient electron emission amount, lifetime, and stability, there arises a problem as discussed below, however.

In the electron source in which the wiring electrodes connected the electron-emitting devices (e.g., the surface conduction electron-emitting devices) each with the electron-emitting region between a pair of device electrodes provided on the surface of the substrate, the device electrodes and the wiring lines were often made of different compositions from the demands for production cost, improvement in electron emission characteristics, and so on. The term "different compositions" herein means both (1) materials different from each other and (2) materials of identical elements but different composition ratios.

For example, (1) includes a case where the wires are made of silver (Ag) and the device electrodes of platinum (Pt), a case where the wires are made of ruthenium oxide ($RuO_2$) and the device electrodes of ruthenium (Ru), and so on. Alloys of different compositions (e.g., a case where the wires are made of an alloy of gold and iridium (A—Ir) and the device electrodes of an alloy of gold and indium (Au—In)) also fall under the category of the different compositions. (2) includes a case where the device electrodes are made of a solder alloy of tin (Sn) and lead (Pb) at a composition ratio of Sn:Pb=7:3 and the wires of a solder alloy thereof at a composition ratio of Sn:Pb=6:4.

In the case of the device electrodes and the wires being made of different compositions as described, the process through the steps of high-temperature processing and the like sometimes caused the wiring material to migrate through the interface between the device electrodes and the substrate and reach the electron-emitting regions, so as to induce unexpected change in the electron-emitting regions, thus posing the problem of change in the electron emission characteristics. The Inventor found that this phenomenon was apt to occur, particularly, in the case where a processed film or the like for preventing diffusion of the substrate material was provided on the surface of the electron source substrate. This will be detailed below with a specific configuration example.

For producing the large-area electron source substrate at low cost, it is necessary to reduce the cost of the members used, and soda lime glass is preferably used for the base of the substrate. In the case of the electron-emitting devices each with a pair of devices electrodes on the substrate surface and the electron-emitting region between the device electrodes, typified by the surface conduction electron-emitting devices and the lateral field emission devices disclosed in aforementioned U.S. Pat. No. 4,904,895, because the electron-emitting regions are formed in contact with the substrate surface, heat and electric fields generated during driving of the electron-emitting devices are also transmitted to the surface of soda lime glass, so as to readily induce thermal deformation of the substrate, migration of sodium ions, precipitation of metal sodium and sodium compounds, and so on. The deformation of the substrate near the electron-emitting devices would cause change of the device structure and the precipitation of sodium would also change the electrical property as well as the structure, thus causing variation and degradation of the electron emission characteristics.

For this reason, for example, in the case of the surface conduction electron-emitting devices, it is desirable to form a coating layer of a material containing the main component of silicon dioxide on the soda lime glass surface and form the surface conduction electron-emitting devices thereon, as disclosed in Japanese Patent Application Laid-Open No. 01-279538. Particularly, when a silica layer or a phosphorus-doped silica (PSG) layer approximately 500 nm or more thick is formed as this coating layer, the coating layer makes it harder for the heat and electric fields in driving of the surface conduction electron-emitting devices to be transmitted to the soda lime glass base and thus can serve as an adequate sodium diffusion preventing layer. As disclosed in Japanese Patent Application Laid-Open No. 2000-215789, it is also possible to form a layer containing an electroconductive oxide, on the soda lime glass surface, further provide a layer containing the main component of silicon dioxide on the surface thereof, and form the surface conduction electron-emitting devices thereon. This coating layer of the two-layer structure also functions better as a sodium diffusion preventing layer to suppress the diffusion of sodium due to the heat and electric fields.

This sodium diffusion preventing layer does not block only the sodium diffusion from the base but also blocks the diffusion of metal placed on the sodium diffusion preventing layer, to the substrate, however. In the structure where the metal is hard to diffuse into the substrate, repetition of thermal treatment steps can result in diffusion of the metal in parallel to the substrate surface along the substrate surface and along the interface between the substrate and the other members.

In the electron source substrate of the configuration as shown in FIG. 10, this diffusion in parallel to the substrate surface occurs at locations where the wiring metal contacts the interface between the device electrodes and the substrate, and becomes more prominent in the case where the device electrodes are made of a metal, particularly, in the case where the device electrodes are made of a metal different from the wiring metal. If the wiring metal diffuses through the interface between the device electrodes and the substrate surface (or the surface of the sodium diffusion preventing layer), it will come to contact the electroconductive, thin films. If a further thermal treatment is carried out at this point or if an electric field in driving is applied, migration of the metal due to the heat or the electric field will result in mixing the wiring metal with the electroconductive thin films and it will become hard to maintain the expected electron emission characteristics of the electron-emitting devices, thus inducing the degradation and variation of characteristics. Accordingly, it was necessary to control the diffusion through the interface of the wiring metal as low as possible.

A solution to this problem heretofore was a method of forming the electron-emitting devices, using an electroconductive oxide for the device electrodes, as disclosed in Japanese Patent Application Laid-Open No. 2000-243327. However, if discharge occurs during driving of the devices, influence thereof will be significant. There were cases where the discharge did not affect only a discharging device but also affected the devices around it, so as to increase the size of defects in the substrate.

SUMMARY OF THE INVENTION

An object of the present invention is therefore to provide an electron source substrate capable of overcoming the degradation of characteristics of the electron-emitting devices due to the foregoing diffusion of the wiring material, and a production method thereof. Particularly, an object of the invention is to provide an electron source substrate capable of preventing the degradation of the electron emission characteristics even in the case where the wiring is formed by an inexpensive method of printing or the like on the substrate surface with the sodium diffusion preventing layer thereon as described above.

Another object of the present invention is to provide a flat image forming apparatus of a large screen capable of providing good images over long periods of time, using the electron source substrate.

The present invention has been accomplished in order to solve the aforementioned problem, i.e., in order to overcome the degradation of characteristics of the electron-emitting devices due to the diffusion of the wiring metal through the interface between the device electrodes and the substrate, and is directed to configurations described below.

Specifically, a first aspect of the present invention is an electron source substrate comprising an electron-emitting device consisting of a pair of device electrodes and an electroconductive thin film having an electron-emitting region; and metal wiring coupled to the device electrodes and made in a composition different from that of the device electrodes, on a substrate, wherein a shortest distance between the electroconductive thin film and the metal wiring along an interface between the device electrodes and the substrate is not less than 50 μm.

The first aspect of the present invention also embraces the following as a further feature:

"the shortest distance is not less than 100 μm."

A second aspect of the present invention is an electron source substrate comprising an electron-emitting device consisting of a pair of device electrodes and an electroconductive thin film having an electron-emitting region; and metal wiring coupled to the device electrodes and made in a composition different from that of the device electrodes, on a substrate, wherein a shortest path between the electroconductive thin film and the metal wiring along an interface between the device electrodes and the substrate is comprised of a combination of straight or curved lines.

The first aspect and the second aspect of the present invention described above also embrace one of the following features as an additional feature:

"a region on a linear shortest path between said conductive thin film and said metal wiring has an area without said device electrode";

"a region on a linear shortest path between said conductive thin film and said metal wiring has an area with said device electrode and an area without said device electrode";

"the device electrodes are comprised of a metal material containing at least a platinum material";

"the substrate is comprised of a glass base containing sodium, and a sodium diffusion preventing layer formed on the glass base";

"the glass base containing sodium is comprised of soda lime glass";

"the sodium diffusion preventing layer is comprised of a silica film 500 nm or more thick";

"the silica film is a silica film doped with phosphorus";

"the sodium diffusion preventing layer is comprised of a film 200 nm or more thick containing an electroconductive oxide, and a silica film 80 nm or more thick containing a main component of silica, formed on the foregoing film";

"the film containing the electroconductive oxide is a microparticle film containing a main component of tin oxide doped with phosphorus";

"the metal wiring is comprised of a metal selected from Ag, Cu, Al, and Au, or an alloy containing the selected metal";

"the electroconductive thin film having the electron-emitting region is comprised of Pd or PdO, or a mixture of Pd and PdO";

"the electron-emitting device is a surface conduction electron-emitting device;"

"the metal wiring is comprised of a plurality of X-directional wires and a plurality of Y-directional wires and a plurality of electron-emitting devices are matrix-wired by the X-directional wires and the Y-directional wires."

A third aspect of the present invention is a method of producing the electron source substrate according to the first or second aspect of the present invention, wherein the metal wiring is formed by printing and heat baking of a metal paste.

A fourth aspect of the present invention is an electron source substrate comprising an electron-emitting device having a pair of device electrodes and an electron-emitting region between the device electrodes; and metal wiring coupled to the device electrodes and made in a composition different from that of the device electrodes, on a substrate, wherein a shortest path between the electron-emitting region and the metal wiring electrically connected to the electron-emitting region along an interface between the device electrodes and the substrate is comprised of a combination of straight or curved lines.

A fifth aspect of the present invention is an image forming apparatus for forming an image on the basis of an input signal, which comprises at least an image forming member, and the electron source substrate according to the first, second, or fourth aspect of the present invention.

Since in the electron source substrate according to the first aspect of the present invention the shortest distance between the electroconductive thin film (device film) and the metal wiring along the interface between the device electrodes and the substrate is not less than 50 μm, it is feasible to effectively prevent the diffusion of the wiring metal to the electroconductive thin film and, in turn, to the electron-emitting region, which can be the cause of the degradation of electron emission characteristics.

Since in the electron source substrate according to the second aspect of the present invention the shortest path between the electroconductive thin film and the metal wiring along the interface between the device electrodes and the substrate is comprised of a combination of straight or curved lines, the distance is increased along the interface between the device electrodes and the substrate, so that it is feasible to effectively prevent the diffusion of the wiring metal to the electroconductive thin film and, in turn, to the electron-emitting region, which can be the cause of the degradation of electron emission characteristics.

The present invention provides the significant effect, particularly, where the substrate is a substrate comprised of a glass base containing sodium, and a sodium diffusion preventing layer formed on the glass base, and is extremely effective, particularly, to the case where the wiring is formed by printing and heat baking of the metal paste.

DETAILED DESCRIPTION OF THE PREFERRED EMBODIMENTS

The present invention will be described below in detail with specific embodiments thereof, but it is noted that the present invention is by no means intended to be limited to these embodiments and that the present invention also embraces all changes and modifications resulting from substitution or design change of elements within the scope where the objects of the present invention are achieved.

Embodiment 1

Figure 1:
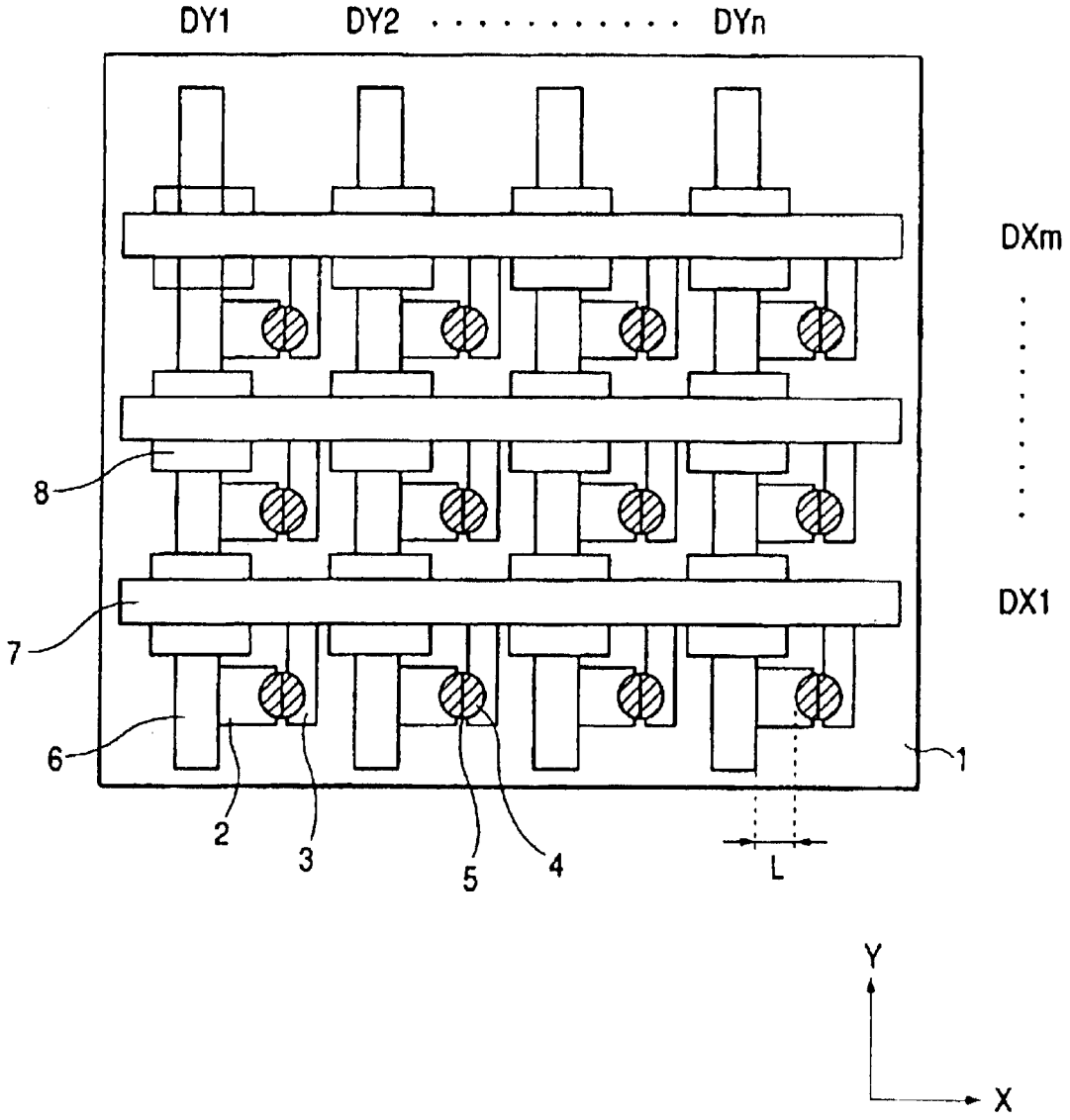
FIG. 1 is a plan view showing an example of the electron source substrate according to the present invention.
Figure 2:
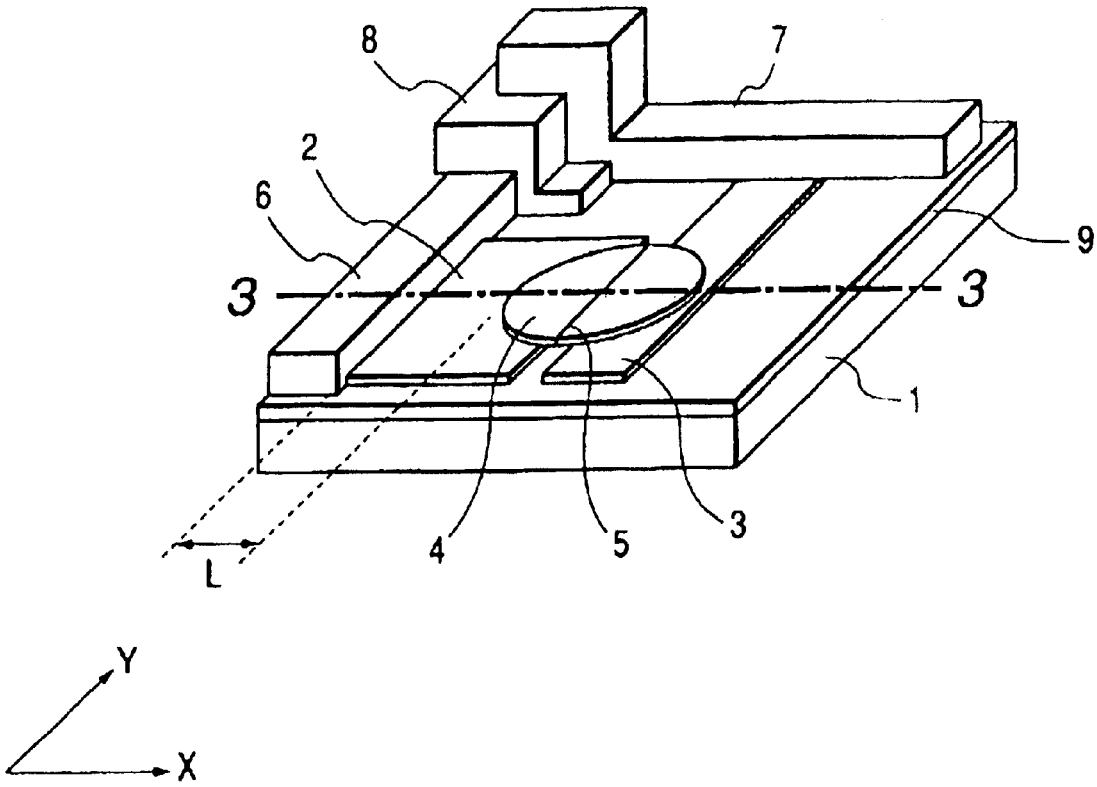
FIG. 2 is a perspective view of a region near an electron-emitting device on the electron source substrate according to the present invention.
Figure 3:
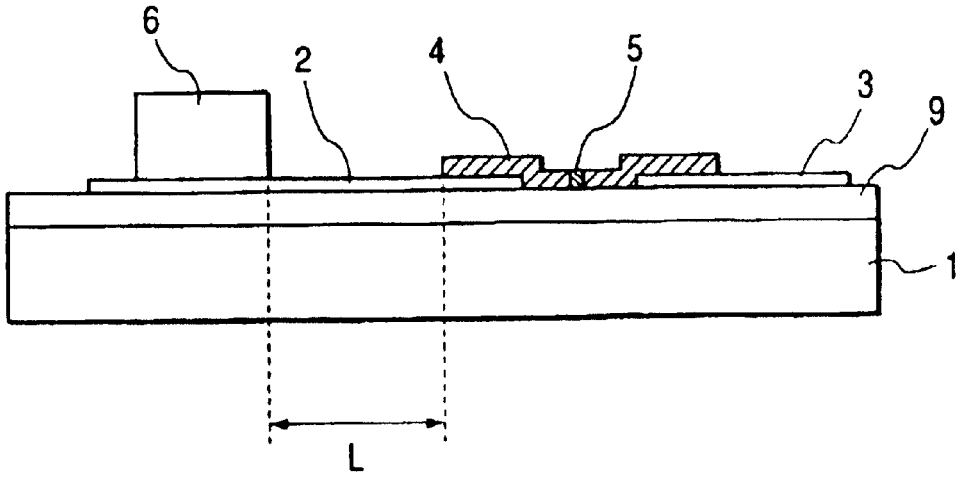
FIG. 3 is a sectional view of the region near the electron-emitting device on the electron source substrate according to the present invention.

FIG. 1 is a schematic configuration diagram (plan view) showing the electron source substrate in the present embodiment, which shows only part of the electron source substrate. FIG. 2 is a perspective view to show an enlarged illustration of one electron-emitting device in the electron source substrate shown in FIG. 1. FIG. 3 is a sectional view along line 3—3 in FIG. 2.

In FIGS. 1, 2, and 3, numeral 1 designates a base, 2 and 3 device electrodes, 4 an electroconductive thin film in each device, 5 an electron-emitting region in each device, 6 and 7 wiring lines coupled to the device electrodes 2 and 3, respectively, 8 interlayer dielectric layers for electrically insulating the wiring lines 6 from the wiring lines 7, and 9 a sodium diffusion preventing layer. The wiring lines 6, 7 are also called Y-directional wires and X-directional wires, respectively, with respect to the coordinate axes in FIG. 1, and are also called lower wires and upper wires, respectively, in view of the positional relations with the interlayer dielectric layers 8. The base 1 and the sodium diffusion preventing layer 9 are described as separate elements herein for convenience' sake of description, and it is to be understood that the substrate in the present invention is one comprised of these elements and that the substrate refers to a member that forms an interface through contact with the device electrodes and the electroconductive thin films.

Soda lime glass, generally called blue sheet glass, is preferably used for the base 1, because it is inexpensive. It is also possible to use a high strain point glass obtained by replacing part of sodium included in soda lime glass with potassium so as to raise the strain point. Such glass bases containing sodium can be made by the float process capable of mass production, by which even a base of a large area 1 m or more diagonal can be produced at low cost, for example. The electron source substrate of the present invention and the image forming apparatus using it are subjected to several heat treatment steps in the production process thereof. The material of the base can be selected according to settings of heat treatment temperatures in the steps and tolerances of strain of the substrate at the heat treatment temperatures.

The sodium diffusion preventing layer 9 is a coating layer having a role of preventing the diffusion of sodium from the base 1 to the electron-emitting devices and a role of resisting transmission of heat generated with flow of current through the electron-emitting devices, to the base 1. For meeting these roles, a coating layer containing the main component of silica can be preferably used as the sodium diffusion preventing layer 9. The "silica" herein refers to $SiO_2$, SiO, and mixtures thereof. Among others, the sodium diffusion preventing layer 9 is more preferably a layer of $SiO_2$, or a layer of phosphorus-doped silica glass (PSG) containing phosphorus several wt %. When one of such coating layers is formed in the thickness of not less than 500 nm, the diffusion of sodium is virtually stopped, so that the coating layer functions as a sodium diffusion preventing layer 9.

Another example of the sodium diffusion preventing layer is one wherein a microparticle coating layer containing the main component of tin oxide doped with phosphorus is formed in the thickness of not less than 200 nm on the surface of the base 1 and another coating layer containing the main component of silica is formed in the thickness of not less than 80 nm on the microparticle coating layer, which can also suppress the diffusion of sodium.

In the present embodiment, a film of $SiO_2$ 1.0 μm thick is formed as the sodium diffusion preventing layer 9 on the cleaned soda lime glass base 1 by sputtering. The method of forming the sodium diffusion preventing layer 9 does not have to be limited to the sputtering, but it can also be made of an organo-metallic coating material by other vacuum evaporation, electron beam evaporation, CVD, and so on.

The opposed device electrodes 2, 3 are preferably made of a material that demonstrates stable electric conductivity even after the subsequent thermal treatment steps and that is resistant to thermal diffusion of the metal making the wires 6, 7.

If the wiring metal diffuses from the metal wires 6, 7 through the device electrodes 2, 3 to the electroconductive thin films 4 and to the electron-emitting regions 5, the electron emission characteristics will become easy to degrade, as described previously. Therefore, the shortest distance L between an electroconductive thin film 4 and the metal wires 6, 7 along the interface between the substrate and the device electrodes 2, 3 electrically connecting the electroconductive thin film 4 with the metal wires 6, 7 is set longer, whereby it is feasible to effectively suppress the diffusion of the metal to the electroconductive thin film 4 and to the electron-emitting region 5.

The shortest distance L in the conventional devices was approximately 15 μm, whereas it is not less than 50 μm in the present invention. If this distance L is less than 50 μm, the effect will be insufficient and the electron emission characteristics will readily degrade.

In the present embodiment, titanium is deposited in the thickness of 5 nm on the base 1 with the sodium diffusion preventing layer 9 thereon, by vacuum evaporation, sputtering, or the like, and platinum is further deposited in the thickness of 40 nm thereon by vacuum evaporation, sputtering, or the like. Thereafter, patterns of the device electrodes 2, 3 are formed of a photoresist by the photolithography technology, patterns of the Ti and Pt films except for the device electrodes 2, 3 are removed by a dry etching process, and the photoresist patterns are finally removed, thereby forming the device electrodes 2, 3. It is also possible to form the device electrodes 2, 3 by printing the patterns by the print technique of offset printing or the like and baking the printed patterns.

The wires 6, 7 are provided for supplying the power to the plurality of electron-emitting devices, as shown in FIG. 1. The m X-directional wires 7 consist of DX1, DX2, . . . , DXm, and the n Y-directional wires 6 of DY1, DY2, . . . , DYn. The material, thickness, wiring width, etc. of the wires are designed so as to supply almost uniform voltages to the many electron-emitting devices. The interlayer dielectric layers 8 are placed between these m X-directional wires 7 and n Y-directional wires 6 to electrically insulate the X-directional wires from the Y-directional wires, thus constituting matrix wiring (wherein m and n are positive integers).

The wires 6, 7 are preferably made of a metal demonstrating stable electric conductivity even after the heat treatment steps, and it is particularly desirable to employ a metal that can be patterned by the printing method capable of forming desired patterns over a large area at low cost. Since metal films obtained by forming patterns of a metal paste by screen printing and thermally treating them are suitable for formation of several μm or more thick films of wires with low resistance over a large area, it is preferable to use Ag, Cu, and Au pastes, which are printable metal pastes available at relatively low price, and it is thus preferable to use Ag, Cu, and Au obtained by thermally treating such pastes, as the wires. It is also possible to use one of mixtures of these metal pastes and, for example, an Ag paste containing Pd, or the like. The wires 6, 7 sometimes demonstrate a less noticeable increase of resistance due to oxidation of the surface, depending upon the conditions of the thermal treatment steps after the formation, and Al easy to oxidize can also be used in such cases.

In the present embodiment, patterns of the wires 6 are printed with an Ag paste by screen printing, on the base 1 with the sodium diffusion preventing layer 9 and the device electrodes 2, 3 thereon, then are dried, and thereafter are baked at 480° C. to form the wires 6 of Ag 20 μm to 50 μm thick in the desired shape.

The shape, material, thickness, and production method of the interlayer dielectric layers 8 can be adequately determined so as to withstand potential differences at the intersections between the wires 6 and the wires 7, and the interlayer dielectric layers are preferably those that can be made by printing, as in the case of the wires. It is also possible to use thick glass layers obtained by printing patterns of a glass paste. In the configuration shown in FIG. 1, i.e., in the matrix arrangement configuration, the X-directional wires 7 are coupled to an unrepresented scanning signal applying means for applying scanning signals for selection of rows of electron-emitting devices arrayed in the X-direction, while the Y-directional wires 6 are coupled to an unrepresented modulation signal generating means for modulating each of columns of electron-emitting devices arrayed in the Y-direction, according to input signals. A drive voltage applied to each electron-emitting device is supplied as a potential difference between a scanning signal and a modulation signal applied to the device of interest, and the individual devices can be selected and independently driven by use of simple matrix wiring.

Besides this arrangement, there are a ladder type arrangement wherein a number of electron-emitting devices arranged in parallel are connected each at both ends to form a lot of rows of electron-emitting devices and wherein electrons from the electron-emitting devices are controlled by control electrodes placed in the direction perpendicular to the wires and above the electron-emitting devices, and other arrangements; but the present invention is not restricted by these arrangements in particular.

In the present embodiment, patterns of the interlayer dielectric layers 8 are formed of a glass paste by screen printing, at the desired position on the lower wires 6, i.e., at the intersections with the upper wires 7 formed in the later step, then are dried, and thereafter are baked at 480° C. In order to ensure sufficient electric insulation, the steps of printing, drying, and baking of the glass paste are performed once again to form the interlayer dielectric layers 8 of glass in the desired shape. For making the interlayer dielectric layers 8 in thickness large enough to provide them with sufficient electrical insulation, it is also possible to repeat the above printing and baking steps a desired number of times.

After that, patterns of the upper wires 7 are printed of an Ag paste by screen printing so as to intersect with the lower wires 6 at the locations where the interlayer dielectric layers 8 were formed, then are dried, and thereafter are baked at 480° C., thereby forming the upper wires 7 of Ag in the desired shape.

The above steps result in forming the substrate in which the device electrodes 2, 3 are matrix-wired by the wires 6, 7.

Since the thermal stability of the electroconductive thin films 4 is a significant parameter that dominates over the lifetime of the electron emission characteristics, it is desirable to use a material with a melting point as high as possible, as a material of the electroconductive thin films 4. However, it normally becomes harder to perform the energization forming, described hereinafter, with increase in the melting point of the electroconductive thin films 4, and thus a higher power is necessary for formation of the electron-emitting regions. Furthermore, the resultant electron-emitting regions sometimes encounter a problem of increase in the applied voltage (threshold voltage) for emission of electrons. Therefore, the material of the electroconductive thin films 4 should be selected from materials and forms having a moderately high melting point and being capable of forming good electron-emitting regions with a relatively low forming power.

In view of the above conditions, PdO is a material suitable for the electroconductive thin films 4 for the following reasons: a thin film thereof can be readily formed by baking of an organic palladium compound in the atmosphere; it is a semiconductor having a relatively low electrical conductivity and requires a low power for the forming; it can be readily reduced into metal palladium during or after the formation of the electron-emitting regions, so as to reduce the film resistance; and so on. The film thickness thereof is determined in consideration of the step coverage over the device electrodes 2, 3, the resistance between the device electrodes 2, 3, the forming conditions described hereinafter, and so on.

In the present embodiment, after the above substrate was cleaned well, the surface thereof was treated with a solution containing a water repellent agent to make the surface hydrophobic. This was done for the purpose of allowing an aqueous solution for formation of device films (electroconductive thin films) subsequently applied, to be placed with a moderate spread on the device electrodes. Then an organic palladium solution was applied to the desired positions by the ink jet method so that each electroconductive thin film 4 spread across a gap between the device electrodes 2, 3, thereby forming the electroconductive thin films 4. In the present embodiment, in order to obtain palladium films as the device films, a palladium-proline complex was first dissolved 0.15% by weight in an aqueous solution of water 85:isopropyl alcohol (IPA) 15, thereby obtaining an organic palladium-containing solution. In addition thereto, a small amount of an additive was added. Droplets of this solution were delivered to between the electrodes, using an ink jet ejecting device using piezoelectric devices, as a droplet delivering means, so that the dot size was adjusted to become 60 μm to 80 μm. Thereafter, a heat baking process was carried out at 350° C. for ten minutes. The electroconductive thin films 4 obtained in this way contained the main component of PdO and the film thickness thereof was approximately 10 nm. The forming process herein was described by the ink jet method, but the production of the electroconductive thin films is not limited to this method. They can also be formed by coating of an organic metal solution, vacuum evaporation, sputtering, CVD, dispersion coating, dipping, spinning with a spinner, and so on.

The sodium diffusion preventing layer 9, lower wires 6, interlayer dielectric layers 8, upper wires 7, device electrodes 2, 3, and electroconductive thin films 4 were formed on the base 1 through the above steps, thereby producing the electron source substrate.

In the electron source substrate in the present embodiment, the shortest distance L between the electroconductive thin film 4 and the metal wire 6 along the interface between the device electrode 2 and the substrate was 50 μm. In the present embodiment, the distance between was electroconductive thin film 4 and the metal wire 6 along the interface between the device electrode 2 and the substrate is shorter than the distance between the electroconductive thin film 4 and the metal wire 7 along the interface between the device electrode 3 and the substrate, so that influence of Ag is more significant from the metal wire 6. For this reason, the distance between the electroconductive thin film 4 and the metal wire 6 along the interface between the device electrode 2 and the substrate is indicated as the shortest distance L. Therefore, if the distance between the electroconductive thin film 4 and the metal wire 7 along the interface between the device electrode 3 and the substrate is shorter, the distance between the electroconductive thin film 4 and the metal wire 7 along the interface between the device electrode 3 and the substrate is to be defined as the shortest distance L.

Each electron-emitting region 5 is a high-resistance region, for example, like a fissure or the like, formed in part of the electroconductive thin film 4. There are also cases where a lot of electroconductive microparticles in particle sizes of several nm to several ten nm, i.e., fine particles of PdO or Pd metal resulting from reduction of PdO are present inside the fissure, which are dependent on the film thickness of the electroconductive thin film 4, the production method including the energization operation conditions described hereinafter, and so on. The electroconductive microparticles are equivalent to part or all of elements of the material forming the electroconductive thin film 4.

Part of the electron-emitting region 5 and the electroconductive thin film 4 near the electron-emitting region 5 have carbon and carbon compounds formed through the activation step described hereinafter. The carbon and carbon compounds are assumed to act as substances constituting the electron-emitting region 5 to dominate over the electron emission characteristics.

As described previously, the wires 6, 7 are coupled to the device electrodes 2, 3 in the present invention. Since the device electrodes 2, 3 are made of a noble metal such as Pt, Au, or the like, there occurs the phenomenon that the metal making the wires 6, 7 diffuses along the interfaces between the device electrodes of the noble metal and the sodium diffusion preventing layer 9. The detailed mechanism of this diffusion is not clarified yet, but it is assumed that the metal making the wires 6, 7 diffuses once into the metal making the device electrodes to reach the interfaces between the device electrodes and the sodium diffusion preventing layer 9 and that the metal diffuses thereafter through grain boundaries in the interfaces.

As the metal making the wires 6, 7 diffuses through the interfaces, it can reach the electroconductive thin film 4 and even the electron-emitting region 5 eventually. If an electric field for driving of the electron-emitting device is applied herein, the metal making the wires 6, 7 can be mixed with the electroconductive thin film 4 because of migration under the electric field and heat during the driving, so as to form an alloy or change the film quality. For this reason, it becomes difficult to maintain the expected electron emission characteristics of the electron-emitting device, and it induces degradation and variation of the characteristics.

When the distance L of not less than 50 μm is secured on the other hand between the electroconductive thin film 4 and the metal wires 6, 7 along the interface between the device electrodes 2, 3 and the substrate as in the present embodiment, it is feasible to effectively suppress the influence of the aforementioned interfacial diffusion of the metal making the wires 6, 7 on the electron-emitting device and thus maintain the stable electron emission characteristics over long periods of time.

Figure 4A:
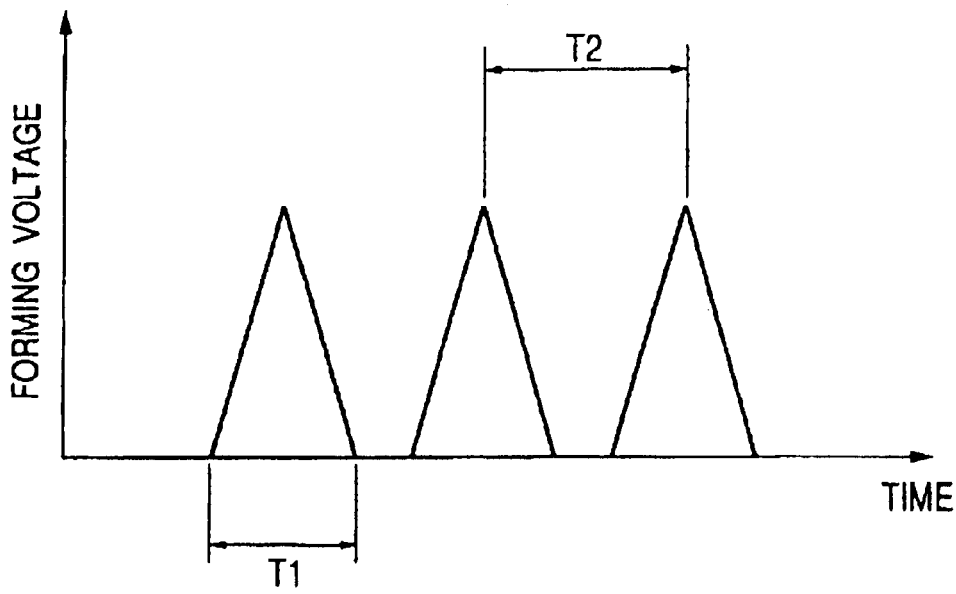
FIGS. 4A and 4B are diagrams showing examples of voltage waveforms in the forming operation according to the present invention.
Figure 4B:
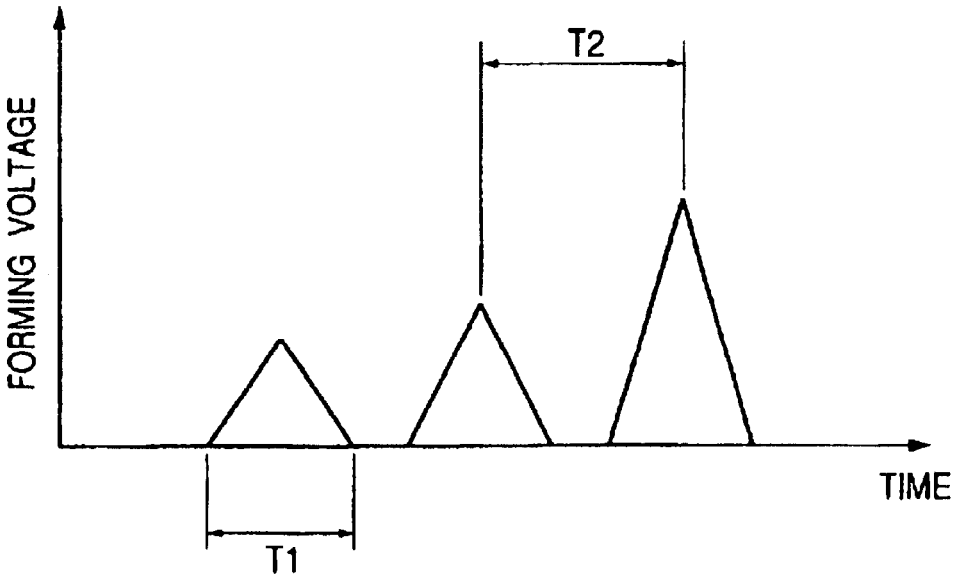

The electron source substrate fabricated as described above is subjected to an energization operation, called forming, of applying a pulsed voltage or an increasing voltage from an unrepresented power supply to between the device electrodes 2, 3, i.e., to between the wires 6, 7, whereby the electron-emitting region 5 is formed as a result of change of structure in a portion of the electroconductive thin film 4. The portion where a fissure structure is formed by locally breaking, deforming, or modifying the electroconductive thin film 4 by the energization operation is referred to as an electron-emitting region 5. FIGS. 4A and 4B show examples of voltage waveforms in the forming. In the present embodiment, the forming was carried out using the voltage waveform of FIG. 4A.

Then the devices after completion of the forming are subjected to the activation operation. As described previously, the electron emission efficiency is very low at this stage. In order to increase the electron emission efficiency, it is thus desirable to perform the operation called activation, for the devices. Specifically, an energization operation similar to the forming is carried out under an organic atmosphere. Carried out thereafter is a step of heating the electron source under an atmosphere excluding the organic substance, to remove unnecessary organic substances and others, which is called a stabilization step.

By employing such a vacuum atmosphere, it is feasible to suppress deposition of additional carbon or carbon compounds, and the device current If and the emission current Ie become stable as a result.

Figure 5:
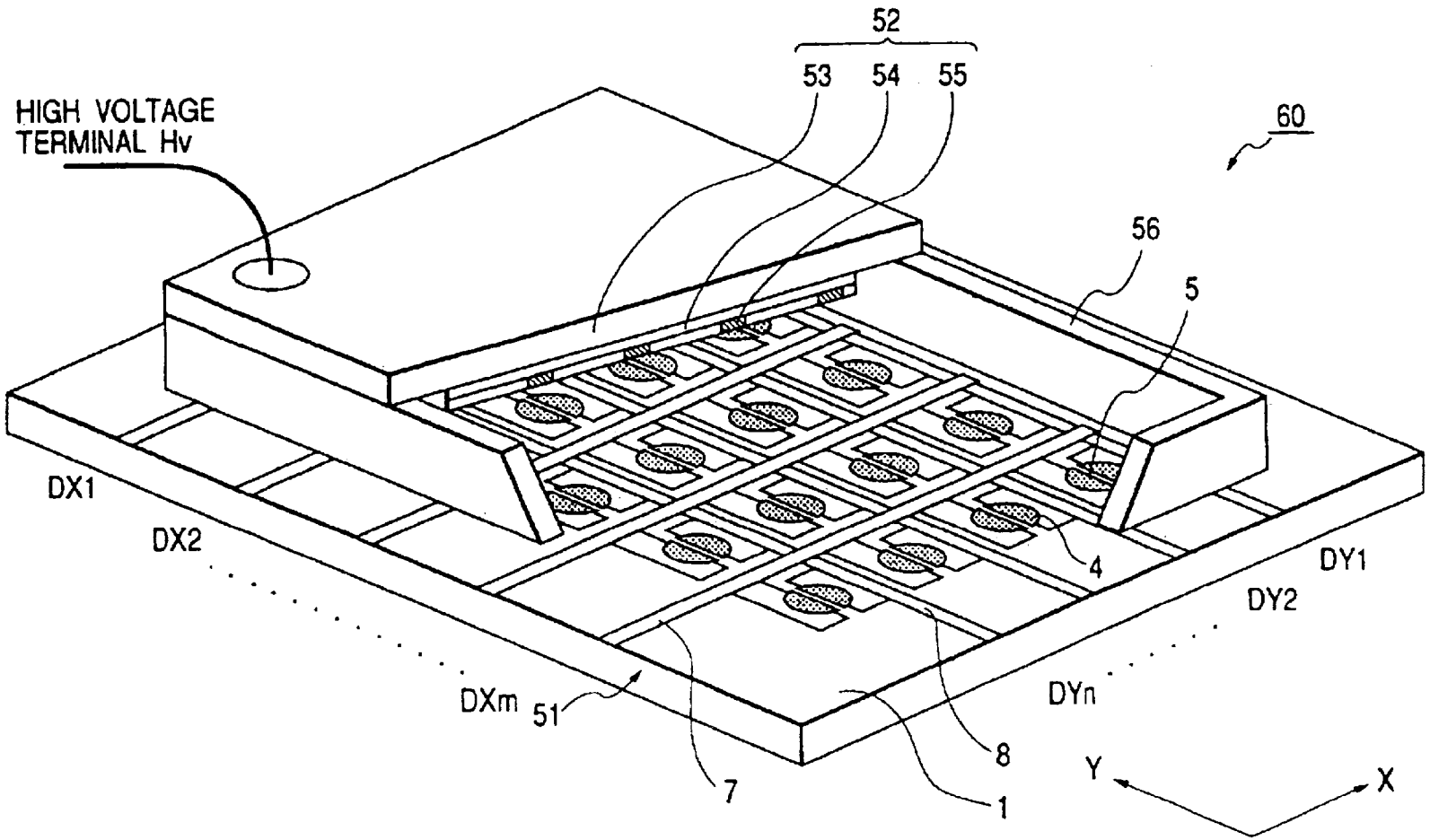
FIG. 5 is a perspective view showing a basic configuration of an image forming apparatus according to the present invention.
Figure 6A:
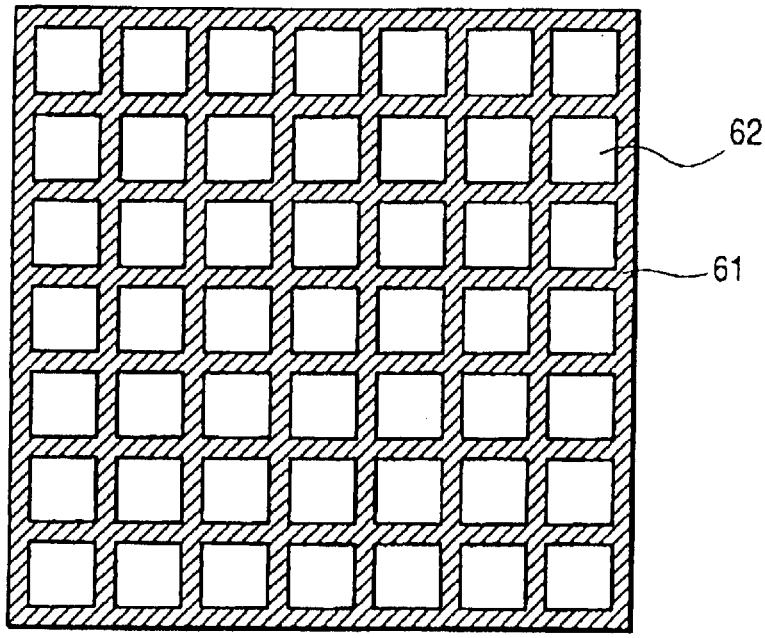
FIGS. 6A and 6B are diagrams showing fluorescent films used in the image forming apparatus of FIG. 5.
Figure 6B:
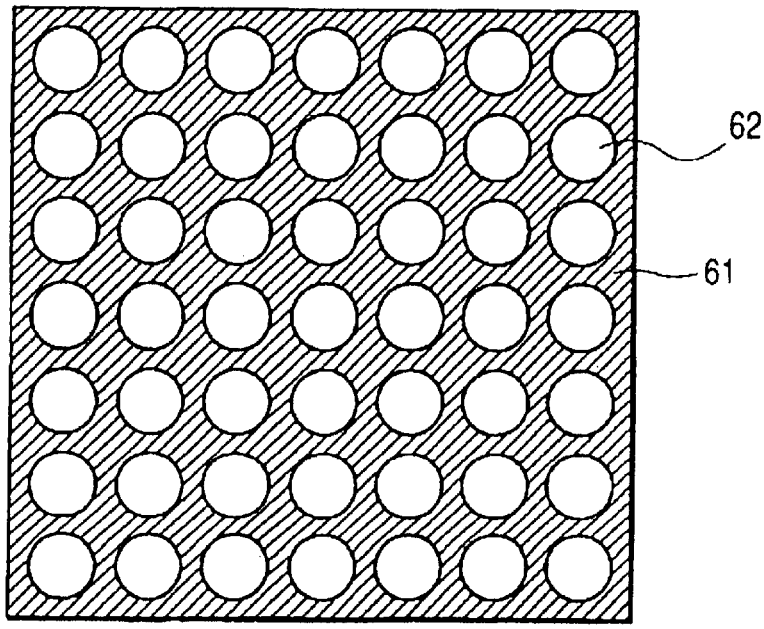

The above described the production steps of the electron source substrate in the present embodiment, and an example of the image forming apparatus constructed using the electron source substrate is shown in FIGS. 5, 6A and 6B. FIG. 5 is a basic configuration diagram of the image forming apparatus and FIGS. 6A and 6B show examples of the fluorescent film placed on a face plate.

In the image forming apparatus of the present invention constructed in this way, scanning signals and modulation signals were applied from respective unrepresented signal generating means through external terminals Dx1 to Dxm and Dy1 to Dyn to the respective electron-emitting devices to induce emission of electrons, and the high voltage of 1 kV was applied through a high voltage terminal Hv to a metal back 55 or to a transparent electrode (not shown) to accelerate electron beams toward the fluorescent film 54, thus obtaining an image.

Figure 7:
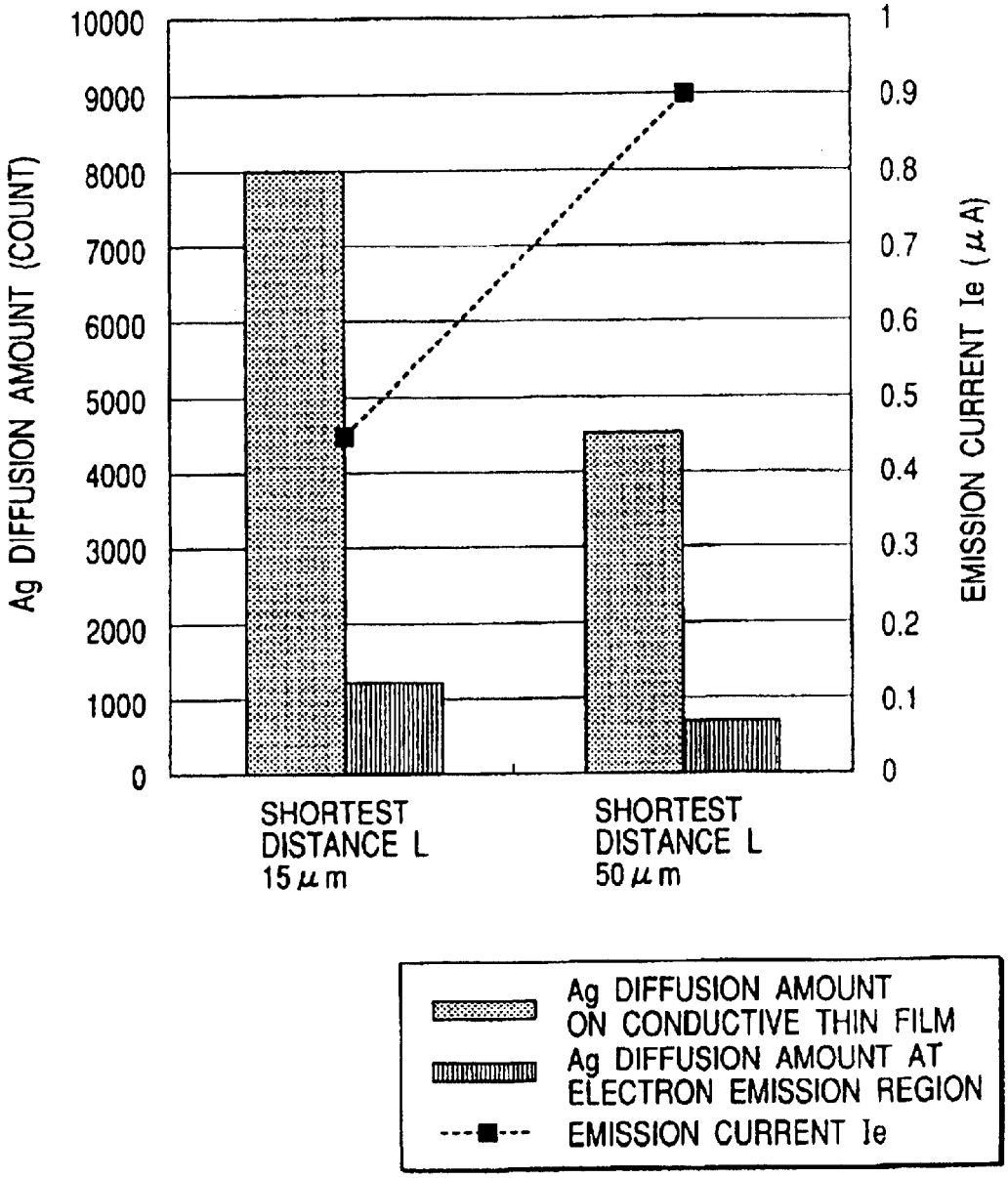
FIG. 7 is a graph to explain the effect of the present invention in Embodiment 1.

Then distribution of the element Ag were measured on the electron-emitting regions and on the electroconductive thin films on the device electrodes by the method of electron probe microanalysis (EPMA), and the results per device are presented in FIG. 7. For comparison, FIG. 7 also shows an example in which the shortest distance L is 15 μm between the electroconductive thin film and the metal wires along the interface between the device electrodes and the substrate (Comparative Example 1).

The analysis was conducted under the following measurement conditions: electron irradiation conditions per μm were 15 kV and 0.1 μA, the analyzing crystal was PET, and the detection wavelength was 4.154 Å (Lα primary ray). Before the measurement of samples in the present embodiment, measurement was done as a reference on the metal wires 6 or 7 and the result of the count of Ag was about 200000 to 300000. Since the count had some variation in the present embodiment, the values herein were handled as relative values.

As apparent from the results of FIG. 7, the present embodiment succeeded in suppressing the diffusion of Ag from the wire 6 to the device electrode 2 and diffusion amounts of Ag on the conductive thin film 4 and on the electron-emitting region 5 were reduced from those in the conventional example. At the same time as it, the value of the emission current Ie also increased, and the bright display device was successfully fabricated.

The configuration described above is a schematic configuration necessary for fabrication of the preferred image forming apparatus used for display and others, and the details, e.g., the materials of the respective members and others, are not limited to the above-stated contents but can be properly selected so as to match applications of the image forming apparatus.

The image forming apparatus according to the present invention can be applied to display devices for television broadcasting, display devices for television conference systems, computers, etc., the image forming apparatus as optical printers constructed using a photosensitive drum and others, and so on. The image forming apparatus in the present embodiment was able to display good images with satisfactory luminance as a television monitor (about 150 fL) stably over long periods of time.

Embodiment 2

The present embodiment is configured so that the shortest distance along the interface between the device electrode and the substrate is longer than the distance on the linear shortest path between the wire and the conductive thin film. Specifically, a device electrode is formed in such an L-shape that the conductive thin film and the wire cannot be connected by a straight line on the device electrode (in other words, that the shortest path connecting the conductive thin film to the wire on the device electrode is comprised of a combination of straight lines), whereby the region on the linear shortest path between the wire and the conductive thin film includes an area with the device electrode and an area without the device electrode.

Figure 8:
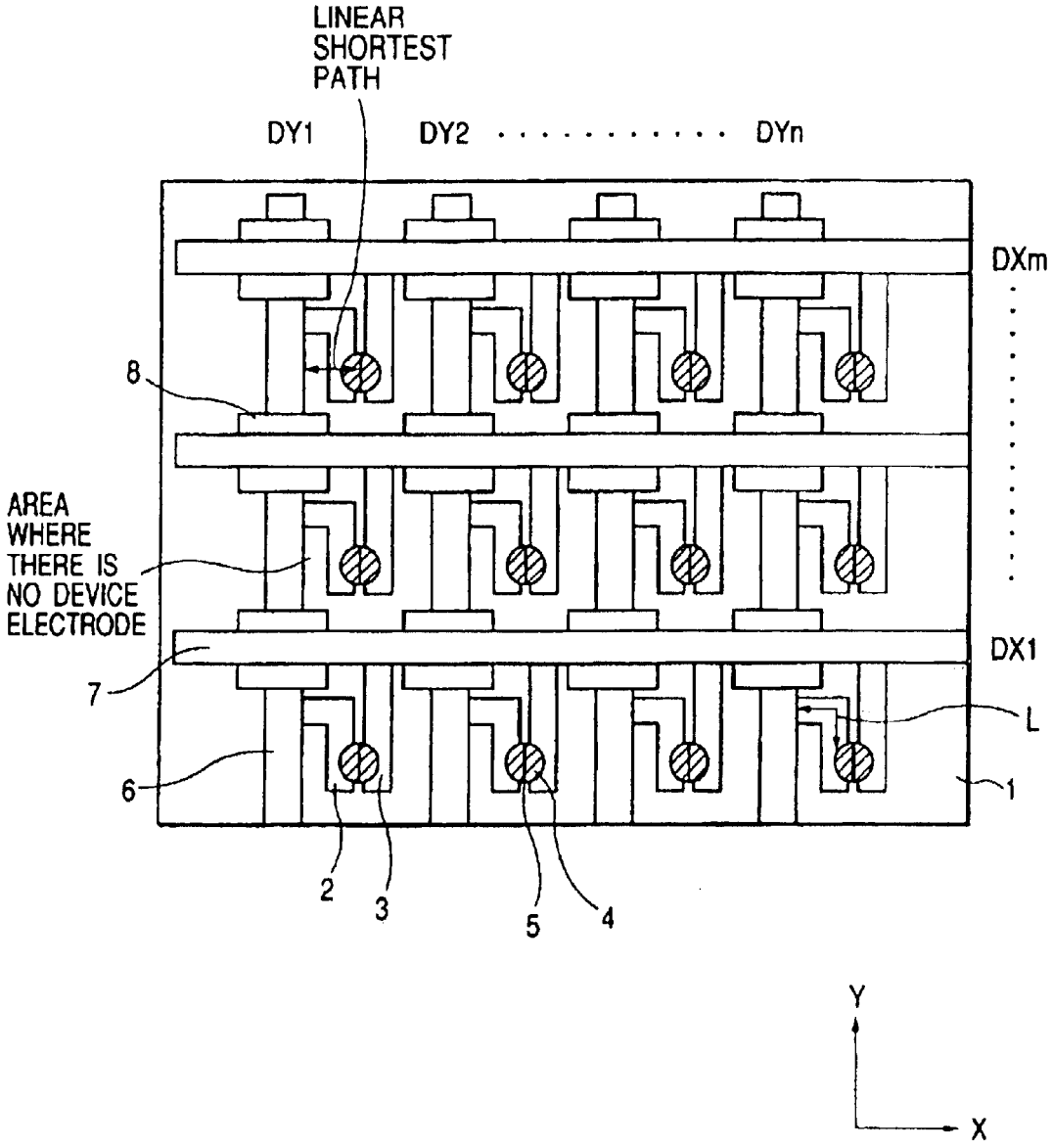
FIG. 8 is a plan view showing another example of the electron source substrate according to the present invention.

FIG. 8 is a schematic configuration diagram (plan view) showing the electron source substrate in the present embodiment, which illustrates only part of the electron source substrate. In FIG. 8, numeral 1 designates a base, 2 and 3 device electrodes, 4 an electroconductive thin film in each device, 5 an electron-emitting region in each device, 6 and 7 wires coupled to the device electrodes 2 and 3, respectively, and 8 interlayer dielectric layers for electrically insulating the wires 6 from the wires 7. In this connection, while not shown in the Figure, a layer for preventing the diffusion of sodium is provided on the surface of base 1. The wires 6 and 7 are called Y-directional wires and X-directional wires, respectively, with respect to the coordinate axes in FIG. 8, and are also called lower wires and upper wires, respectively, from the positional relations with the interlayer dielectric layers 8.

The opposed device electrodes 2, 3 are preferably made of a material that has stable electrical conductivity even after the subsequent thermal treatment steps and that is resistant to thermal diffusion of the metal making the wires 6, 7, as in Embodiment 1.

The greater among the diffusions of the metal from the metal wires 6, 7 is the diffusion of the metal from the wire 6 to the electron-emitting device, as in Embodiment 1.

In the present embodiment, therefore, the device electrode 2 of each device is formed in the L-shape as shown in FIG. 8, whereby the shortest path between the conductive thin film and the metal wire along the interface between the device electrode and the substrate is comprised of a combination of straight lines, which results in increasing the distance between the conductive thin film 4 and the metal wire 6 along the interface between the device electrode and the substrate. In the present embodiment, as shown in FIG. 8, the region on the linear shortest path between the conductive thin film 4 and the metal wire 6 includes an area with the device electrode 2 and an area without the device electrode 2, thereby enhancing the effect of suppressing the diffusion of the wiring material.

In the present embodiment, titanium is deposited in the thickness of 5 nm of the base 1 with the sodium diffusion preventing layer thereon, by vacuum evaporation, sputtering, or the like, and platinum is further deposited in the thickness of 40 nm thereon by vacuum evaporation, sputtering, or the like. Thereafter, patterns of the device electrodes 2, 3 as shown in FIG. 8 are formed of a photoresist by the photolithography technology, patterns of the Ti and Pt films except for the device electrodes 2, 3 are removed by a dry etching process, and the photoresist patterns are finally removed, thereby forming the device electrodes 2, 3. It is also possible to form the device electrodes 2, 3 by printing the patterns by the printing technique of offset printing or the like and baking the patterns.

In the present embodiment, the patterns were formed so that the shortest distance L between the conductive thin film and the metal wire along the interface between the device electrode and the substrate became 100 μm and so that the distance (linear distance) on the linear shortest path to the metal wire 6 became 40 μm. As Comparative Example 2, another electron source substrate was also prepared in a configuration wherein the device electrodes 2 were not of the L-shape but of the rectangular shape similar to that in Embodiment 1 and wherein the distance (linear distance) on the linear shortest path between the conductive thin film and the metal wire 6 was 40 μm, as in the case of the electron-emitting devices using the L-shaped device electrodes. In other words, part of the rectangular device electrode in the comparative example was cut off so as to make an area without the device electrode, thereby forming each L-shaped device electrode. Comparative Example 3 was also prepared in a configuration wherein the device electrodes were formed in the rectangular shape, as in Comparative Example 2, and the distance (linear distance) on the linear shortest path to the metal wire 6 was 100 μm.

The basic configuration of the electron source substrate except for the above portions, and the other production steps are similar to those in Embodiment 1, and thus the description thereof is omitted in the present embodiment.

In the image forming apparatus of the present embodiment constructed as described above, scanning signals and modulation signals were applied from the unrepresented signal generating means through the external terminals Dx1 to Dxm, Dy1 to Dyn to the respective electron-emitting devices to induce emission of electrons, the high voltage of 1 kV was applied through the high voltage terminal Hv to the metal back or to the transparent electrode (not shown) to accelerate electron beams toward the fluorescent film, and the emission current Ie was measured.

Figure 9:
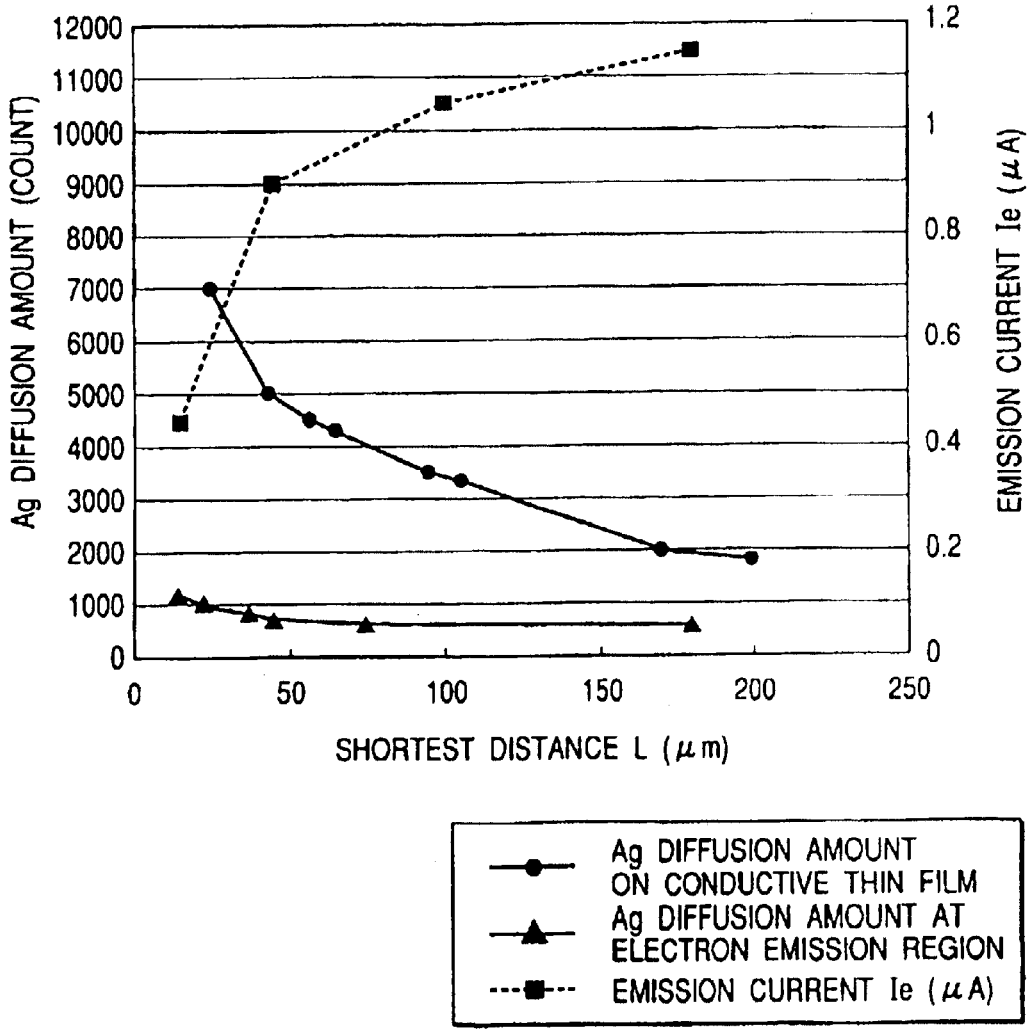
FIG. 9 is a graph to explain the effect of the present invention in Embodiment 2.
Figure 10:
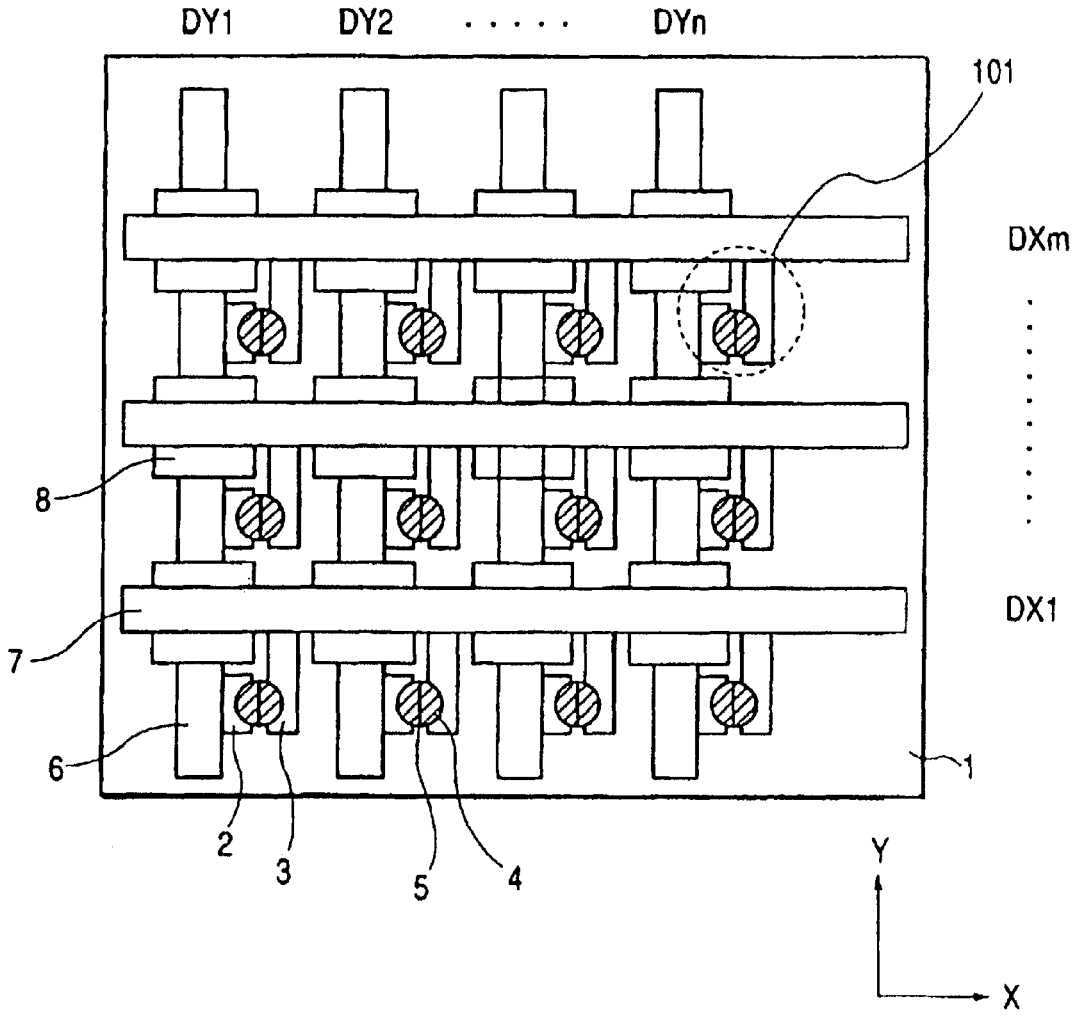
FIG. 10 is a plan view showing the configuration of the conventional electron source substrate.

Distributions of the element Ag were measured on the electron-emitting regions and on the conductive thin films on the device electrodes by the method of electron probe microanalysis (EPMA), and the results per device are presented in FIG. 9. The horizontal axis of FIG. 9 represents the shortest distance between the wire and the conductive thin film or the electron-emitting region along the interface between the device electrode and the substrate. For comparison, FIG. 9 also presents the results of Embodiment 1.

The analysis was conducted with EPM-8109 available from Shimadzu Corp. and under the following measurement conditions: the electron irradiation conditions per μm were 15 kV and 0.1 μA, the analyzing crystal was PET, and the detection wavelength 4.154 Å (Lα primary ray). Before the measurement of samples in the present embodiment, measurement as a reference was done on the metal wires 6 or 7, and the count of Ag was about 200000 to 300000. Furthermore, the count had some variation and thus the values were handled as relative values.

As seen from the results of FIG. 9, in the present embodiment the diffusion of Ag from the metal wire 6 to the device electrode 2 is suppressed more with increase in the shortest distance L and diffusion amounts of Ag on the conductive thin film 4 and on the electron-emitting region 5 decrease largely therewith. It is also seen that the diffusion amount of Ag on the electron-emitting region becomes saturated at the shortest distance L around approximately 100 μm. The value of the emission current Ie also increased with increase in the shortest distance, and the bright display device was successfully fabricated.

As also seen from FIG. 9, when the shortest distance L is less than 50 μm, the diffusion of the metal to the conductive thin film 4 and to the electron-emitting region 5 is not suppressed well (diffusion amounts increase rapidly), and the emission current Ie is relatively low.

In the present embodiment, the distance between the conductive thin film 4 and the metal wire 6 along the interface between the device electrode 2 and the substrate is shorter than the distance between the conductive thin film 4 and the metal wire 7 along the interface between the device electrode 3 and the substrate, so that the influence of Ag from the metal wire 6 is greater; therefore, the distance between the conductive thin film 4 and the metal wire 6 along the interface between the device electrode 2 and the substrate is indicated as the shortest distance L. If the distance between the conductive thin film 4 and the metal wire 7 along the interface between the device electrode 3 and the substrate is shorter, the shortest length L is to be represented by the distance between the conductive thin film 4 and the metal wire 7 along the interface between the device electrode 3 and the substrate accordingly.

The following will describe comparison in diffusion amounts of silver in the L-shaped device electrodes of the present embodiment with Comparative Examples 2 and 3.

(1) When comparison with Comparative Example 3 was made to compare counts of silver on the conductive thin film between the devices of the present embodiment and the devices of Comparative Example 3, the devices of the present embodiment demonstrated the count of a little over 3000, while Comparative Example 3 did the count of a little over 4000. This verifies that even if the distance between the conductive thin film and the wire along the interface between the device electrode and the substrate is same, the diffusion of the wiring material can be reduced when the path is comprised of a combination of straight or curved lines.

(2) When comparison with Comparative Example 2 was made to compare counts of silver on the conductive thin film between the devices of the present embodiment and the devices of Comparative Example 2, the electron-emitting devices with the L-shaped device electrodes in the present embodiment demonstrated the diffusion amount of the count of about 3000, whereas the devices of Comparative Example 2 did the count of about 6000. Therefore, the shape in the present embodiment decreased the diffusion amount to approximately half of that in Comparative Example 2. This verifies that even if the distance on the linear shortest path is equal between the wire and the conductive thin film (or the electron-emitting region) the diffusion of the wiring material can be prevented well by providing the area with the device electrode and the area without the device electrode on the linear shortest path between the wire and the electron-emitting region.

As described above, the devices of the present embodiment are able to suppress the diffusion of the wiring material by the configuration wherein the shortest path between the conductive thin film and the metal wire along the interface between the device electrode and the substrate is comprised of a combination of straight or curved lines or by the configuration wherein the region on the linear shortest path between the conductive thin film and the metal wire includes the area with the device electrode and the area without the device electrode.

The configuration wherein the shortest path between the conductive thin film and the metal wire along the interface between the device electrode and the substrate is comprised of the combination of straight or curved lines, does not always have to be limited to the combination of straight or curved lines on the surface of the substrate like the L-shape in the above embodiment; for example, the diffusion of the wiring material can also be suppressed well in the case where the interfacial distance is increased by a configuration wherein the shortest path is comprised of a combination of straight or curved lines in the direction of the thickness of the substrate like an uneven surface formed by roughening the surface of the substrate.

It is also feasible to suppress the diffusion of the wiring material, by changing the shape of the device electrode or the position of the conductive thin film so that the device electrode is not located on the linear shortest path between the conductive thin film and the metal wire.

The image forming apparatus in the present embodiment was also able to display good images with satisfactory luminance (about 150 fL) as a television monitor stably over long periods of time.

According to the present invention, as described above, the shortest distance is not less than 50 μm between the device film (conductive thin film) of the electron-emitting device and the metal wire along the interface between the device electrode and the substrate, whereby it is feasible to effectively suppress the diffusion of the wiring metal onto the conductive thin film and onto the electron-emitting region which could cause the degradation of the electron emission characteristics.

Since the region on the linear shortest path between the electron-emitting region and the metal wire includes the area with the device electrode and the area without the device electrode, it is feasible to effectively suppress the diffusion of the wiring metal onto the electron-emitting region which could cause the degradation of the electron emission characteristics.

The present invention permits use of the sodium diffusion preventing layer used for improvement in the electron emission characteristics and the printed wires allowing easy formation of the large-area electron source substrate at low cost, thereby realizing the inexpensive high-performance electron source substrate. Furthermore, use of the substrate permits realization of a large-screen flat-type image forming apparatus capable of maintaining good images over long periods of time, e.g., a color flat television monitor.

What is claimed is:

1. An electron source substrate comprising an electron-emitting device consisting of a pair of device electrodes and an electroconductive thin film having an electron-emitting region; and metal wiring coupled to the device electrodes and made in a composition different from that of the device electrodes, on a substrate, wherein a shortest distance between the conductive thin film and the metal wiring along an interface between the device electrodes and the substrate is not less than 50 μm.

2. The electron source substrate according to claim 1, wherein said shortest distance is not less than 100 μm.

3. An electron source substrate comprising an electron-emitting device [consisting of] *having* a pair of device electrodes and [an electroconductive thin film having] an electron-emitting [region] *member connected to said pair of device electrodes*; and metal wiring coupled to the device electrodes and made in a composition different from that of the device electrodes, on a substrate, wherein *the metal wiring includes at least one X-directional wire and at least one Y-directional wire which intersect each other, one of the device electrodes is connected to the X-directional wire and another of the device electrodes is connected to the Y-directional wire, at least one of said pair of device electrodes is defined in shape so that* a path with a shortest distance between the [conductive thin film] *electron-emitting member* and the metal wiring along an interface between [the device electrodes] *said at least one device electrode* and the substrate is comprised of a combination of straight or curved lines *forming an angle*.

4. The electron source substrate according to claim 3, wherein a region on a linear shortest path between said [conductive thin film] *electron-emitting member* and said metal wiring has an area without a device electrode.

5. The electron source substrate according to claim 1 or 3, wherein said device electrodes are comprised of a metal material containing at least a platinum material.

6. The electron source substrate according to claim 1 or 3, wherein said substrate is comprised of a sodium-containing glass base and a sodium diffusion preventing layer formed on the glass base.

7. The electron source substrate according to claim 6, wherein said sodium-containing glass base is comprised of soda lime glass.

8. The electron source substrate according to claim 6, wherein said sodium diffusion preventing layer is comprised of a silica film 500 nm or more thick.

9. The electron source substrate according to claim 8, wherein said silica film is a phosphorus-doped silica film.

10. The electron source substrate according to claim 6, wherein said sodium diffusion preventing layer is comprised of a film 200 nm or more thick containing an electroconductive oxide, and a silica film 80 nm or more thick formed on said film and containing a main component of silica.

11. The electron source substrate according to claim 10, wherein said film containing the *electro*conductive oxide is a microparticle film containing a main component of tin oxide doped with phosphorus.

12. The electron source substrate according to claim 1 or 3, wherein said metal wiring is comprised of a metal selected from Ag, Cu, Al, and Au, or an alloy containing said metal.

13. The electron source substrate according to claim 1 [or 3], wherein said electroconductive thin film having the electron-emitting region is comprised of Pd or PdO, or a mixture thereof.

14. The electron source substrate according to claim 1 or 3, wherein said electron-emitting device is a surface conduction electron-emitting device.

15. The electron source substrate according to claim 1 [or 3], wherein said metal wiring is comprised of a plurality of X-directional wires and a plurality of Y-directional wires and wherein a plurality of electron-emitting devices are matrix-wired by the X-directional wires and the Y-directional wires.

16. A method of producing the electron source substrate as set forth in claim 1 or 3, wherein said metal wiring is formed by printing and heat baking of a metal paste.

17. An electron source substrate comprising an electron-emitting device having a pair of device electrodes and an electron-emitting [region between the device electrodes] *member connected to at least one of said pair of device electrodes*; and metal wiring coupled to the device electrodes and made in a composition different from that of the device electrodes, on a substrate, wherein *the metal wiring includes at least one X-directional wire and at least one Y-directional wire which intersect each other, one of the device electrodes is connected to the X-directional wire and another of the device electrodes is connected to the Y-directional wire, at least one of said pair of device electrodes is defined in shape so that* a path with a shortest distance between said electron-emitting [region] *member* and said metal wiring electrically coupled to the electron-emitting [region] *member* along an interface between said *at least one* device [electrodes] *electrode* and said substrate is comprised of a combination of straight or curved lines *forming an angle*.

18. An image forming apparatus for forming an image on the basis of an input signal, comprising at least an image forming member and the electron source substrate as set forth in one of claim 1, 3, or 17.

19. The electron source substrate according to claim 3, wherein at least one of the straight or curved lines, of which the path with the shortest distance is comprised, has a length in a thickness direction of the substrate.

20. The electron source substrate according to claim 17, wherein at least one of the straight or curved lines, of which the path with the shortest distance is comprised, has a length in a thickness direction of the substrate.

21. The electron source substrate according to claim 3, wherein at least one of the straight or curved lines, of which the path with the shortest distance is comprised, has a length in a direction in parallel to a surface of the substrate.

22. The electron source substrate according to claim 17, wherein at least one of the straight or curved lines, of which the path with the shortest distance is comprised, has a length in a direction in parallel to a surface of the substrate.

*23. An electron source substrate comprising an electron-emitting device consisting of a pair of device electrodes and an electron-emitting member connected to said pair of device electrodes; and metal wiring coupled to the device electrodes and made in a composition different from that of the device electrodes, on a substrate, wherein the wiring includes at least one X-directional wire and at least one Y-directional wire which intersect each other, one of the device electrodes is connected to the X-directional wire and another of the device electrodes is connected to the Y-directional wire, at least one of said pair of device electrodes is defined in shape so that a linear shortest path between the electron emitting member and at least one of the X-directional and Y-directional wires traverses at least part of one device electrode and an area on the substrate where any part of said at least one device electrode is not defined.*

*24. An electron source substrate according to any one of claims 3, 17, and 23, wherein at least one of the device electrodes forms an L-shape.*

* * * * *